United States Patent [19]

Axmann

[11] Patent Number: 5,456,349
[45] Date of Patent: Oct. 10, 1995

[54] BELT CONVEYOR

[75] Inventor: Norbert Axmann, Sinsheim-Hoffenheim, Germany

[73] Assignee: Axmann-Fördertechnik GmbH, Sinsheim-Steinsfurt, Germany

[21] Appl. No.: 173,364

[22] Filed: Dec. 23, 1993

[30] Foreign Application Priority Data

Dec. 24, 1992 [DE] Germany .............. 42 44 170.6

[51] Int. Cl.$^6$ .............................................. B65G 15/02
[52] U.S. Cl. ............................................ 198/831; 198/835
[58] Field of Search .............................. 198/831, 832, 198/835, 840

[56] References Cited

U.S. PATENT DOCUMENTS

| | | | |
|---|---|---|---|
| 2,413,339 | 12/1946 | Stadelman | 198/835 X |
| 3,153,475 | 10/1964 | Swanson | 198/831 |
| 4,875,568 | 10/1989 | Hermann et al. | 198/835 X |
| 4,887,708 | 12/1989 | Brown et al. | 198/831 |
| 5,332,082 | 7/1994 | Sommerfield | 198/831 |

FOREIGN PATENT DOCUMENTS

| | | | |
|---|---|---|---|
| 0669147 | 11/1929 | France | 198/835 |
| 0766980 | 10/1980 | U.S.S.R. | 198/835 |
| 0609235 | 9/1948 | United Kingdom | 198/831 |

*Primary Examiner*—James R. Bidwell
*Attorney, Agent, or Firm*—Max Fogiel

[57] ABSTRACT

A belt conveyor having an endless conveyor belt with an upper run and a lower run. A frictional wheel frictionally engages the lower belt run opposite a belt support roller acting as a counterpressure roller and a pivot arm carrying the friction wheel. A spring urges the wheel against the lower belt run so that, on driving of the wheel in clockwise sense, the lower belt run is frictionally driven in corresponding direction. The pivot axis of the pivot arm is at a downstream— with respect to the drive direction of the lower belt run—side of a plane containing the axes of the friction wheel and counterpressure roller. The contact pressure force between lower belt run and friction wheel varies proportionally to change in the peripheral force to be transmitted to the belt run for drive thereof.

17 Claims, 2 Drawing Sheets

BELT CONVEYOR

BACKGROUND OF THE INVENTION

The present invention relates to a belt conveyor and has particular reference to a conveyor with an endless conveying belt band and associated deflecting rollers and intermediate rollers.

Belt conveyors of this kind are known, in which the belt is driven by means of a friction wheel. Thus, for example, in German Patent Specification No. 34 21 413 there is described a belt conveyor in which a friction wheel is arranged between runs of the conveyor belt and the runs are urged against the friction wheel by means of counterpressure rollers engaging from the outside. It is evident that, to achieve a predetermined coefficient of friction, the pressure between the friction wheel and the belt must be stronger the greater are the peripheral forces to be transmitted to the belt for drive thereof. In order to ensure a reliable drive even at maximum loading, the pressure between the friction wheel and the conveyor band must therefore be set to the highest possible loading. This has the disadvantage that the belt is highly stressed in the region of engagement of the friction wheel even in the case of idling, and thus a high degree of wear arises both at the friction wheel and the belt.

In the case of the conveyor described in the aforementioned patent specification, the belt has a curved path. When curved path belt conveyors of that kind are highly loaded, blockages of the belt can occur, with the consequence that the friction wheel overruns and possibly grinds through the belt at the point of engagement. This danger exists particularly when the contact pressure between the belt and the friction wheel is too low. However, lowering of the contact pressure can easily occur during operation, as the friction coating of the friction wheel may become thinner due to wear in the course of time and the contact pressure force then reduces.

SUMMARY OF THE INVENTION

It is therefore the object of the present invention to provide a belt conveyor with improved friction wheel driving of the conveyor belt.

Other objects and advantages of the invention will be apparent from the following description.

According to the invention there is provided a belt conveyor comprising an endless conveying belt which is led over deflecting rollers and over support rollers arranged between the belt runs and which is driven by means of at least one friction wheel engaging at a run in the region of a counterpressure roller, wherein the friction wheel is so mounted on a pivot arm, which is pivotable about a stationary axis on a side of a plane opposite the sense of rotation of the friction wheel, the plane intersecting the axes of rotation of the friction wheel and the counterpressure roller, that the contact pressure force varies proportionally to a change in the peripheral force to be transmitted to the belt for the drive thereof. Thus, the friction wheel is pressed against the belt run with a contact pressure force which is proportional to the peripheral force to be transmitted.

The basis of this load-dependent pressing of the friction wheel against the belt run is the articulation, which is spaced from a plane extending through the rotational axes of the counterpressure roller and the friction wheel, of the pivot arm on the side opposite to the sense of rotation of the friction wheel. This means that, if the friction wheel rotates in clockwise sense, the articulation point or pivot axis of the pivot arm is disposed on the lefthand side of the plane. If the friction wheel rotates in anticlockwise sense, the articulation point of the pivot arm is disposed on the righthand side of the plane.

The pressing of the friction wheel against the belt run in proportion to the load has the advantage that the contact pressure force necessary for the transmission of the respectively applied peripheral force is regulated by that force. The friction wheel and thus the portion of the belt co-operating therewith are, in part load operation, loaded only by the contact pressure force which corresponds to the respective power. By comparison with conventional belt conveyors with friction wheel drive, this leads to an appreciable reduction in wear, and the risk of overrunning of the friction wheel due to lowering of the contact pressure force as a result of wear does not exist.

The friction wheel can engage the upper, i.e. forward, run of the belt or the lower, i.e. return, run. However, engagement with the lower run has proved to be expedient and, for preference, at the underside of the lower belt run in the region of one of the support rollers, which support roller is arranged between the runs and acts as the counterpressure roller.

In a preferred embodiment, the conveyor further comprises a drive shaft, which is in operative connection with a drive motor and is connected with the friction wheel to be secure against rotation relative thereto. The drive shaft is mounted to be angularly movable in bearings in the region of an end thereof carrying the friction wheel end and an end thereof connected to the motor, wherein the bearing at the friction wheel end is located in the pivot arm and the bearing at the motor end is located in a fixed bracket in the conveyor. This construction is such that regardless of the fact that the motor end of the drive shaft is mounted in a fixed bracket the shaft can, without being forced, execute the slight angular movements arising on regulation of the contact pressure force of the friction wheel against the belt.

The use of self-aliging roller bearings has proved to be of advantage as the angularly movable bearings of the drive shaft.

It has also proved to be advantageous if the friction wheel engages the lower belt run in the region of one edge thereof, while the motor-end bearing of the drive shaft is disposed in the region of the other edge of the belt run.

If the conveyor is constructed so that the belt has a curved path it may be advantageous if the friction wheel engages at the edge of the lower belt run which is convexly curved and the motor-end bearing of the shaft is arranged in the region of the concavely curved edge.

In the case of an embodiment with the drive shaft mounted to be angularly movable at the friction wheel end and at the motor end, the drive motor is preferably operatively connected with the shaft, as well as mounted to be pivotally movable within limits, by means of an attachable bevel gear. In particular, the drive motor can be pendulatingly connected to the drife shaft and secured against rotation therewith by means of a torque support, which bears by way of resilient means against a counterbearing at a fixed location in the conveyor.

BRIEF DESCRIPTION OF THE DRAWINGS

An embodiment of the present invention will now be more particularly described by way of example with reference to the accompanying drawings, in which.

DESCRIPTION OF THE PREFERRED EMBODIMENTS

Figure 1:
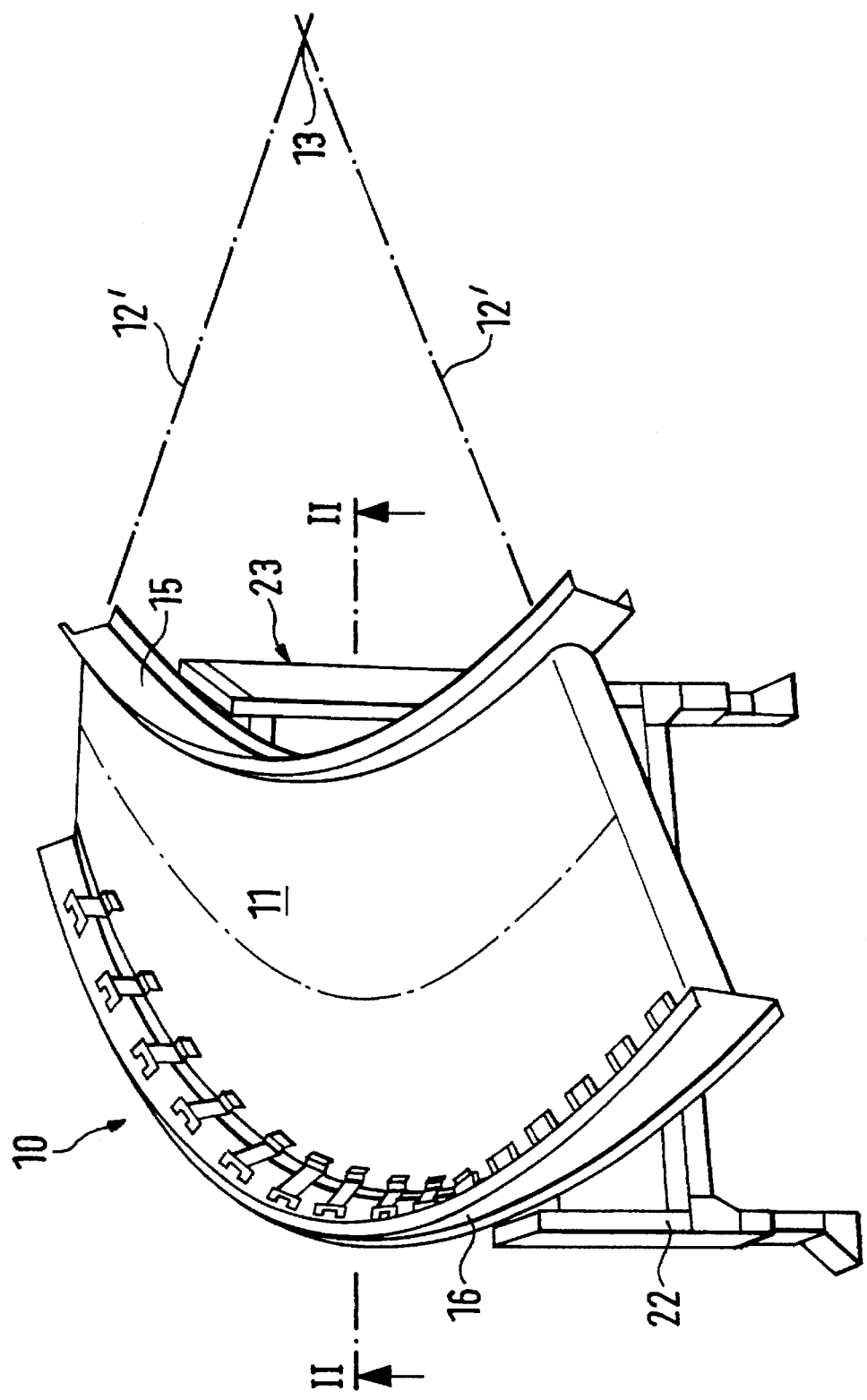
FIG. 1 is a perspective view of a curved path belt conveyor embodying the invention.
Figure 2:
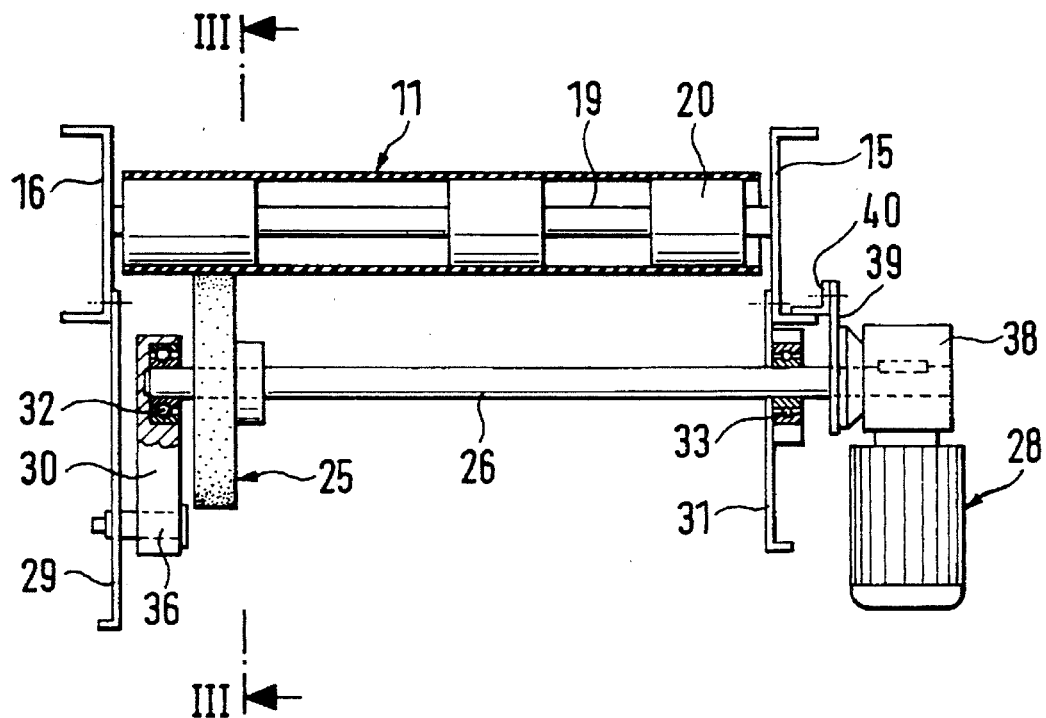
FIG. 2 is a cross-section, to an enlarged scale, along the line II—II in FIG. 1.
Figure 3:
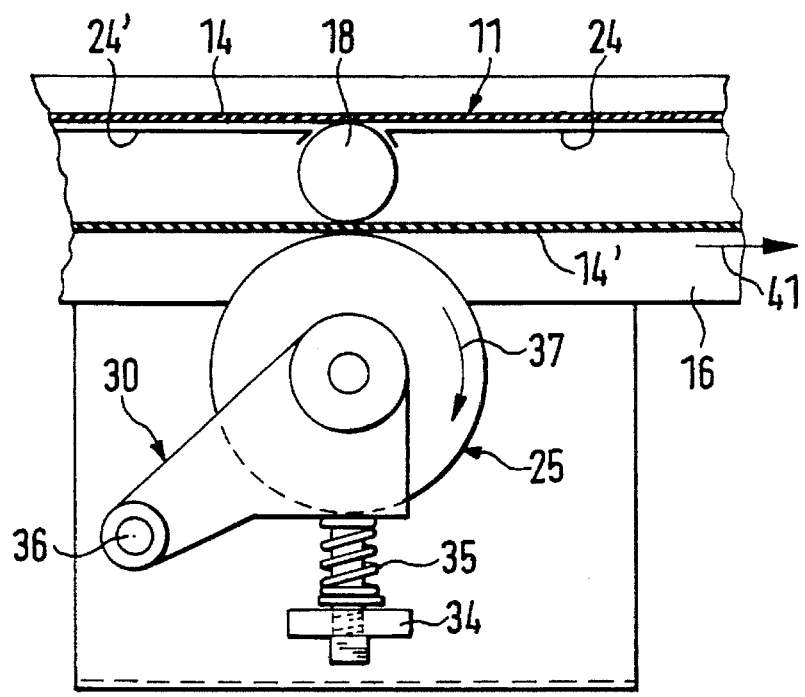
FIG. 3 is a sectional view, to an enlarged scale, along the line III—III in FIG. 2.

Referring now to the drawings there is shown a curved path belt conveyor 10, which is illustrated in its entirety in FIG. 1. The conveying path of the conveyor extends, as seen in plan view, over a sector of a circular ring and is formed by an endless conveyor belt 11. This conveyor belt consists of sections in the form of conical frustums which are glued together and is led over deflecting rollers, which are arranged at the end of the sectorial path and the axes 12 and 12' of which intersect at the centre 13 of curvature. The deflecting rollers deflect the belt at the transitions between an upper, forward run 14 and a lower, return run 14'. Each deflecting roller can have a conical shape enlarging in direction from the inner boundary of the path to the outer boundary. Alternatively, the deflecting rollers can be provided by cylindrical roller elements, which are mounted axially adjacent one another and running freely on roller axles, in the region of the upper run 14 at the belt and conical guide rollers, which are arranged thereunder, in the transition regions to and from the lower run 14'.

In the case of the illustrated curved path belt conveyor 10, the belt has a strongly distorted curve and the belt 11 rises appreciably from one deflecting roller to the other deflecting roller. The belt is guided between an inner cheek 15 and an outer cheek 16 over the deflecting rollers and also over support rollers 18, which are arranged between the two runs 14 and 14' and between which respective sliding bed supports 24 and 24' extend. The support rollers 18 again consist of cylindrical roller elements 20 which are mounted to be axially adjacent one another and freely running on roller axles 19. The axles themselves are mounted in the cheeks 15 and 16 of the conveyor. The cheeks in their turn are mounted on a stand 23 with vertical supports 22.

The conveyor belt 11 is frictionally driven by means of a friction wheel 25, which engages at the underside of the lower belt run 14' in the region of the outer curved edge and which is mounted, secure against rotation, on a drive shaft 26. The end of the drive shaft remote from the friction wheel is operatively connected with a drive motor 28. The drive shaft is mounted at its friction wheel end in a bearing 32 in a pivot arm 30, which is articulated at a bracket 29 secured to the cheek 16 and spaced from a plane intersecting the shaft axis. At its motor end, the shaft is mounted in a bearing 33 in a bracket 31 secured to the cheek 15. The drive shaft bearings 32 and 33 are self-aligning roller bearings, which permit limited angular movement of the shaft.

The friction wheel is biassed by a-compression spring 35, which bears against a support 34 at the bracket 29 and engages at the underside of the pivot arm 30 to urge the friction wheel 25 with a predetermined contact pressure force against the underside of the lower belt run 14' in the region of a carrier roller 18 acting as a counterpressure roller. The spring is adjustable in length to vary the pressure it exerts on the pivot arm 30 and thus the contact pressure force. The pivot arm 30 is mounted to be pivotable about an axle 36 which is arranged at the bracket 29 on that side of a plane, which intersects the axes of the counterpressure roller and the friction wheel, opposite the sense of rotation of the friction wheel. In view of the design of the drive with the friction wheel 25 rotating in clockwise manner as indicated by an arrow 39, the axle is disposed to the left at a spacing from the afore-mentioned plane.

The operative connection of the drive shaft 26 with the drive motor 28 is provided by an attachable bevel gear unit 38, which is mounted on an end portion of the drive shaft protruding beyond the cheek 15, and the bracket 31 firmly connected therewith, at the inward side of the curved path. By virtue of this association of the drive motor and the drive shaft, the drive motor is mounted to be pendulating. To secure against undesired co-rotation of the motor and shaft, a torque stay 39 extends out from the motor or the bevel gear unit connected therewith and bears, on the side remote from the motor, against a support 40, which is fixed relative to the conveyor stand 23, by way of resilient means (not shown). Accordingly, the drive motor together with the gear unit can execute limited pendulating movement relative to the shaft axis.

In operation of the belt conveyor, the friction wheel 25, driven by means of the drive motor and urged against the underside of the lower belt run 14' by the spring force acting on the underside of the pivot arm 30, transmits a frictional entraining force to the belt and drives the lower run in the direction indicated by an arrow 41. Accordingly, a reaction force, which is equal in amount to the entraining force but of opposite direction, acts back on the friction wheel in the region of the contact line between the wheel and the lower run. The reaction force counteracts the contact pressure force, which is provided by the spring 35, on the friction wheel in the line of contact of the wheel with the lower run. This reaction force produces a turning moment about the axle 36 of the pivot arm 30, this moment being opposite to that produced by the spring 35.

If the turning moments about the axle 36 of the pivot arm 30 are equal in amount, each increase in the entraining force to be transmitted to the belt 11 leads to a proportional rise in the contact pressure force. This means that the contact pressure force automatically regulates itself in dependence on the peripheral force to be transmitted. A prerequisite for the moment equilibrium about the axle of the pivot arm is, in that case, that the tangent of the angle, which is formed between the plane intersecting the axes of the counterpressure roller 18 and the friction wheel 25 and a line connecting the axis of the axle 36 and the point of engagement of the friction wheel with the lower belt run, is equal to the coefficient of friction of the couple consisting of friction wheel and conveyor belt.

I claim:

1. A belt conveyor comprising: an endless conveyor belt defining a forward run and a return run; deflecting rollers arranged to deflect said belt at transitions between the runs; intermediate rollers having axes of rotation and arranged to act on the belt between said deflecting rollers; a friction wheel having an axis of rotation and arranged to frictionally engage the belt at one run thereof and opposite one of said intermediate rollers arranged to function as a counterpressure roller, said friction wheel being rotatable to frictionally drive said one run of the belt in a predetermined direction; and a pivot arm carrying said friction wheel and having a pivot axis disposed in a stationary location in the conveyor and at one side of a plane containing axes of rotation of said friction wheel and said counterpressure roller, said one side being a downstream side of said plane with respect to a predetermined direction of motion of said one run of the belt, said friction wheel engaging said one run of the belt with a contact pressure varying in proportion to change in a peripheral driving force exerted on said belt run by said friction wheel.

2. A conveyor according to claim 1, wherein said one run of the belt is disposed below the other run of the belt.

3. A conveyor according to claim 2, wherein said friction wheel is arranged to engage an underside of said one run of the belt.

4. A conveyor according to claim 1, wherein all of said intermediate rollers are support rollers supporting said belt.

5. A conveyor according to claim 1, comprising further a rotary drive shaft connected to said friction wheel to be secure against rotation relative thereto and mounted to be angularly movable to accommodate pivot movement of said pivot arm.

6. A conveyor according to claim 5, comprising further support means for said rollers, first bearing means arranged at said support means and second bearing means arranged at said pivot arm, the said drive shaft being mounted in the bearing means.

7. A conveyor according to claim 6, each of the first and second bearing means being a self-aligning roller bearing.

8. A conveyor according to claim 6, wherein said friction wheel is arranged in a region of one lateral edge of said one run of the belt and said second bearing means is arranged in a region of a lateral edge of said run.

9. A conveyor according to claim 8, wherein said one run of said belt is substantially planar and extends along a curved path, an edge of said run being convexly curved and said lateral edge of said one run being concavely curved.

10. A conveyor according to claim 5, comprising further a drive motor drivingly coupled to said drive shaft.

11. A conveyor according to claims 10, wherein said motor is drivingly coupled to said shaft at an end thereof remote from said friction wheel.

12. A conveyor according to claim 11, comprising further bevel gear means coupling said motor to said shaft, said motor being pivotable within predetermined limits.

13. A conveyor according to claim 10, wherein said motor is coupled to said shaft so as to be capable of pendulating movement; said securing means to secure said motor against rotation with said shaft.

14. A conveyor according to claim 13, wherein said securing means comprises a torque stay and resilient means connecting said stay to a fixed point in the conveyor.

15. A belt conveyor as defined in claim 1, wherein said plane forms an angle with a line connecting an engagement point of said friction wheel at said return run with said pivot axis of said pivot arm, said angle having a tangent value equal to a friction wheel coefficient of a couple comprised of said friction wheel and said conveyor belt.

16. A belt conveyor comprising: guide rollers and carrier rollers; an endless conveying band defining a forward run and a return run and passed over said guide rollers and said carrier rollers, said guide rollers and said carrier rollers being arranged at transitions between said runs of said conveying band; a counterpressure roller and at least one friction wheel engaging at a run position in a region of said counterpressure roller; a pivot arm mounting said friction wheel, said pivot arm pivoting on an axle secured on a side of a plane located opposite rotation of said friction wheel, said plane intersecting axes of rotation of said friction wheel and said counterpressure roller and forming an angle with a line connecting an engagement point of said friction wheel at the return run with said axle of said pivot arm, said angle having a tangent value equal to a friction wheel coefficient of a couple comprised of said friction wheel and said conveying band.

17. A belt conveyor comprising: an endless conveyor belt defining a forward run and a return run; deflecting rollers arranged to deflect said belt at transitions between the runs; intermediate rollers having axes of rotation and arranged to act on the belt between said deflecting rollers; a friction wheel having an axis of rotation and arranged to one of said intermediate rollers arranged to function as a counterpressure roller, said friction wheel being rotatable to frictionally drive said one run of the belt in a predetermined direction; and a pivot arm carrying said friction wheel and having a pivot axis disposed in a stationary location in the conveyor and at one side of a plane containing axes of rotation of said friction wheel and one of said intermediate rollers, said one side being a downstream side of said plane with respect to a predetermined direction of motion of said one run of the belt, said friction wheel engaging said one run of the belt with a contact pressure varying in proportion to change in a peripheral driving force exerted on said belt run by said friction wheel; a rotary drive shaft connected to said friction wheel to be secure against rotation relative thereto and mounted to be angularly movable to accommodate pivot movement of said pivot arm.

* * * * *